Patented Nov. 12, 1929

1,735,405

UNITED STATES PATENT OFFICE

WILHELM MEISER, OF LUDWIGSHAFEN-ON-THE-RHINE, WALTER SCHUBARDT, OF MANNHEIM, AND OSKAR KRAMER, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PURE IRON OF SMALL GRAIN SIZE

No Drawing. Application filed August 28, 1928, Serial No. 302,648, and in Germany September 10, 1927.

In the manufacture of iron cores for electromagnetic apparatus, such as transformers, Pupin coils, and the like, use is preferably made of an iron powder, which has been subjected to heat treatment in a reducing atmosphere and which is comprised of very small and spherical particles. In this heat treatment the small amounts of carbon and oxygen contained in the iron are eliminated, but sintering occurs at the same time and necessitates regrinding in order to restore to the particles that original small grain size and spherical form which are essential for the said purpose. It has however been found when carrying out this process, in particular on a large scale, that it is not always possible to bring the whole of the material back into its fine condition. Especially when the material has been heated to high temperatures, such as from 500° to 600° centigrade, considerable amounts, as much as 30 per cent and more, of screening residues are left over after grinding, which are not directly applicable for the purpose required; but, on the other hand, the material obtained by the use of high temperatures is just that which possesses the best electromagnetic properties.

We have now found that this difficulty is overcome and the sintering restricted within moderate limits by carrying out the operation in two stages; the powder being first treated with a reducing gas free from carbon such as hydrogen, or ammonia, at about 500° centigrade and then, without, if desired, any intermediate cooling, being heated to temperatures above 500° centigrade but below its melting point with or without the employment of hydrogen or inert gases. The treatment in the first stage decarburizes and deoxidizes the iron, at least partially, whilst in the second stage at higher temperatures the valuable electromagnetic properties are imparted to the iron. It has been found that the elimination of carbon and oxygen from the iron proceeds at a sufficiently rapid rate even at temperatures below 500° centigrade without any substantial sintering taking place. On subsequent heating to higher temperatures, the iron which has been sufficiently decarburized and deoxidized in this manner is no longer liable to extensive sintering and therefore the crushing is unattended with difficulty.

The following example will further illustrate the nature of the said invention which however is not restricted thereto.

Example

Iron powder, prepared from iron carbonyl by heat treatment and containing 1.6 per cent of carbon is spread out in a thin layer in a suitable furnace and is treated with a current of, preferably preheated, hydrogen at temperatures below 500° centigrade until an examination of the escaping gases shews that the formation of methane and water, that is the decarburizing or deoxidizing, is substantially complete. The material cooled in an atmosphere of hydrogen still contains about 0.02 to 0.15 per cent of carbon, and can easily be crushed down in a mill so as to leave behind practically no residue on a sieve with 4900 meshes per square centimetre. This powder, which has a permeability of about 17, is returned to the furnace and is heated at from 500° to 600° centigrade for several hours in a current of hydrogen, nitrogen or any other gas which does not produce a chemical change in the iron at high temperatures. After cooling, for example in a current of nitrogen, the mass can be easily ground without leaving any appreciable screen residue, but now has a permeability of between 25 and 32 and, in consequence of its other electromagnetic properties, such as negligible hystereses losses, and the like, is especially adapted for the manufacture of cores for Pupin coils.

It is however not essential to allow the material to cool down, as above mentioned, after decarburizing, and on taking it out of the furnace to return it thereto after grinding. On the contrary, as soon as decarburizing, by heating in the reducing gas below 500° centigrade has sufficiently progressed, the temperature may be raised to from 500° to 600° centigrade and, as already described, maintained thereat until the desired electromagnetic properties have been acquired. The current of reducing gas is advantageously maintained at a very high velocity, since the treatment can thereby be considerably shortened. Also in this case the product is found to be only slightly sintered, after cooling in a current of nitrogen, and can be easily restored to its original fine globular condition by grinding, as for example in a ball mill, without leaving any substantial residue on screening.

Also it is not essential that the decarburizing process below 500° centigrade should be carried to the extent herein specified, namely as low as to 0.02 to 0.15 per cent of carbon, especially when the subsequent rise in temperature above 500° centigrade only proceeds slowly. The transfer from the first stage to the second can even be effected while the iron still contains larger amounts of carbon than those mentioned but not more than 0.5 per cent.

The iron powder obtained according to the present invention may also be used for purposes other than the manufacture of iron cores. For example, it is also excellently adapted for the manufacture of transformer plates, in the radio industry, for coherers, thermal elements, and the like.

What we claim is:

1. A process of producing pure iron of small grain size which comprises treating iron powder with a reducing gas free from carbon at temperatures between about 300° C. and about 500° C. until the carbon content is at most 0.5 per cent and then heating in an inert atmosphere to temperatures above 500° C. but below its melting point and grinding the iron.

2. A process of producing pure iron of small grain size which comprises treating iron powder with hydrogen at temperatures between about 300° C. and about 500° C. until the carbon content is at most 0.5 per cent and then heating in an inert atmosphere to temperatures above 500° C. but below its melting point and grinding the iron.

3. A process of producing pure iron of small grain size which comprises treating iron powder with a current of hydrogen at temperatures between about 300° C. and about 500° C. until the carbon content is at most 0.5 per cent, then gradually raising the temperature to between 500° and 600° C. and cooling the iron in a nitrogen atmosphere and grinding it.

4. A process of producing pure iron of small grain size which comprises treating iron powder produced by thermal decomposition of iron carbonyl with hydrogen at temperatures between about 300° C. and about 500° C. until the carbon content is at most 0.5 per cent and then heating in an inert atmosphere to temperatures above 500° C. but below its melting point and grinding the iron.

In testimony whereof we have hereunto set our hands.

WILHELM MEISER.
WALTER SCHUBARDT.
OSKAR KRAMER.